(12) United States Patent
Sridhar et al.

(10) Patent No.: US 10,785,114 B2
(45) Date of Patent: *Sep. 22, 2020

(54) FINGERPRINTING BYOD (BRING YOUR OWN DEVICE) AND IOT (INTERNET OF THINGS) IPV6 STATIONS FOR NETWORK POLICY ENFORCEMENT

(71) Applicant: Fortinet, Inc., Sunnyvale, CA (US)

(72) Inventors: PC Sridhar, Bangalore (IN); Pradeep Mohan, Bangalore (IN); Anil Kaushik, Bangalore (IN)

(73) Assignee: Fortinet, Inc., Sunnyvale, CA (US)

( * ) Notice: Subject to any disclaimer, the term of this patent is extended or adjusted under 35 U.S.C. 154(b) by 32 days.

This patent is subject to a terminal disclaimer.

(21) Appl. No.: 16/043,157

(22) Filed: Jul. 24, 2018

(65) Prior Publication Data

US 2019/0020547 A1 Jan. 17, 2019

Related U.S. Application Data

(63) Continuation of application No. 15/396,606, filed on Dec. 31, 2016, now Pat. No. 10,033,590.

(51) Int. Cl.
  *H04L 12/24* (2006.01)
  *H04L 29/12* (2006.01)
  *H04W 84/12* (2009.01)
  *H04W 84/18* (2009.01)
  *H04W 88/08* (2009.01)

(52) U.S. Cl.
  CPC ...... *H04L 41/0893* (2013.01); *H04L 61/2015* (2013.01); *H04L 61/6059* (2013.01); *H04W 84/12* (2013.01); *H04W 84/18* (2013.01); *H04W 88/08* (2013.01)

(58) Field of Classification Search
  None
  See application file for complete search history.

(56) References Cited

U.S. PATENT DOCUMENTS

| | | | | |
|---|---|---|---|---|
| 8,320,954 | B2 * | 11/2012 | Cryderman | H04W 88/04 455/552.1 |
| 2008/0084888 | A1 * | 4/2008 | Yadav | H04L 45/02 370/395.31 |
| 2013/0182707 | A1 * | 7/2013 | Angst | H04L 12/44 370/390 |
| 2014/0269717 | A1 * | 9/2014 | Thubert | H04L 63/1458 370/392 |
| 2016/0212040 | A1 * | 7/2016 | Bhagavathiperumal | H04L 45/28 |

* cited by examiner

*Primary Examiner* — Shripal K Khajuria
(74) *Attorney, Agent, or Firm* — Law Office of Dorian Cartwright; Dorian Cartwright

(57) ABSTRACT

IoT stations are profiled in an IPv6 protocol environment. Responsive to sending the modified router advertisement instead of the router advertisement to the station, a DHCPv6 solicitation packet is snooped. The DHPv6 solicitation packet is sent from the station to a DHCPv6 server to gather network configuration information stored in the router advertisement withheld by the access point. In turn, the access point examines the DHCPv6 solicitation packet to determine an identity of least one of device and operating system. The identity determination is stored for applying network policies (e.g., network security policies) during transactions with the station.

8 Claims, 6 Drawing Sheets

FINGERPRINTING BYOD (BRING YOUR OWN DEVICE) AND IOT (INTERNET OF THINGS) IPV6 STATIONS FOR NETWORK POLICY ENFORCEMENT

RELATED APPLICATIONS

This application is a continuation of U.S. application Ser. No. 15/396,606, filed on Dec. 31, 2016, which is incorporated herein by reference in its entirety.

FIELD OF THE INVENTION

The invention relates generally to computer networking, and more specifically, to fingerprinting (or profiling) IPv6 stations in a stateless autoconfiguration mode.

BACKGROUND

IoT (Internet of Things) devices such as sensors, smart appliances and even shoes are burdening networks along with conventional devices such as smart phones and tablet computing devices.

Under the IPv6 protocols, router solicitations are sent by a station for gaining configuration information to join a network. This allows networks to profile the stations and apply policies for network control. These stations can be BYOD (bring your own device) stations, such as a personal smartphone, that are not controlled by an entity or organization, as are the company computers and terminals which are known to and controlled by the network.

However, in some circumstances, IPv6 does not provide the necessary information for providing BYOD stations.

What is needed is a robust technique to profile stations in an IPv6 Wi-Fi network.

SUMMARY

These shortcomings are addressed by the present disclosure of methods, computer program products, and systems for profiling IPv6 stations on a data network.

In one embodiment, a router advertisement sent by the router to a station is received, in response to a router solicitation message received by the router from the station. Either an O (other) flag or an M (managed) flag of the router advertisement is detected as not set. Responsive to the router advertisement detection, a modified router advertisement with both the O and M flag are set is generated and sent without forwarding the original router advertisement.

In another embodiment, responsive to sending the modified router advertisement instead of the router advertisement to the station, a DHCPv6 solicitation packet is snooped. The DHPv6 solicitation packet is sent from the station to a DHCPv6 server to gather network configuration information stored in the router advertisement withheld by the access point. In turn, the access point examines the DHCPv6 solicitation packet to determine an identity of least one of device and operating system. The identity determination is stored for applying network policies (e.g., network security policies) during transactions with the station.

Advantageously, IoT devices can be profiled in IPv6 autoconfiguration protocols.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for steering wireless stations of a Wi-Fi network based on data exchange capacity. One of ordinary skill in the art will recognize many additional variations made possible by the succinct description of techniques below.

Figure 1:
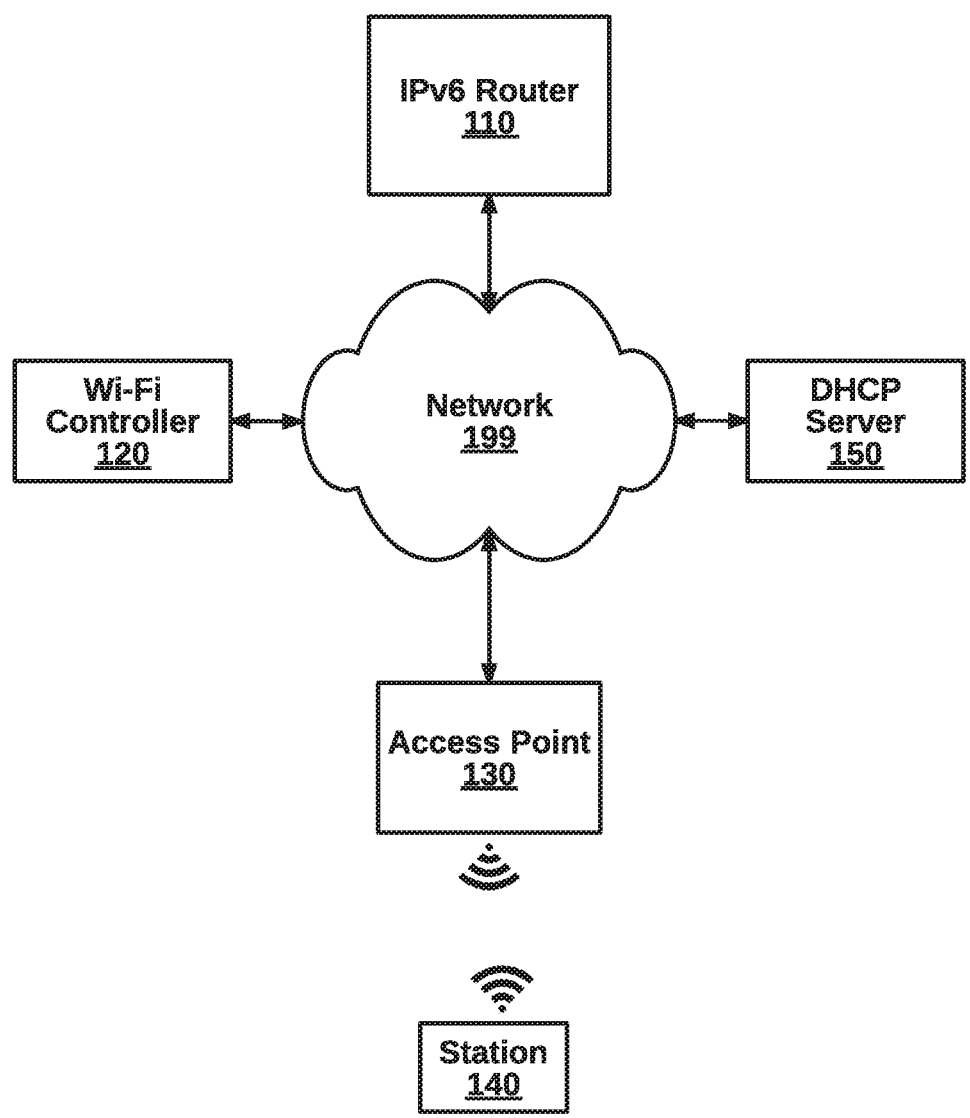
FIG. 1 is a high-level block diagram illustrating a system to profile IoT devices, according to one embodiment.
Figure 2:
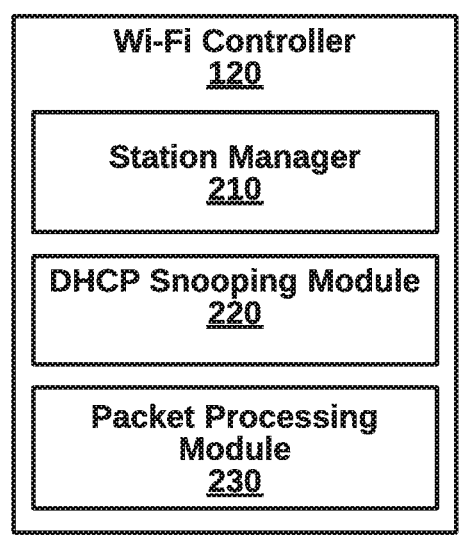
FIG. 2 is a more detailed block diagram illustrating a Wi-Fi controller of the system of FIG. 1, respectively, according to one embodiment.
Figure 3:
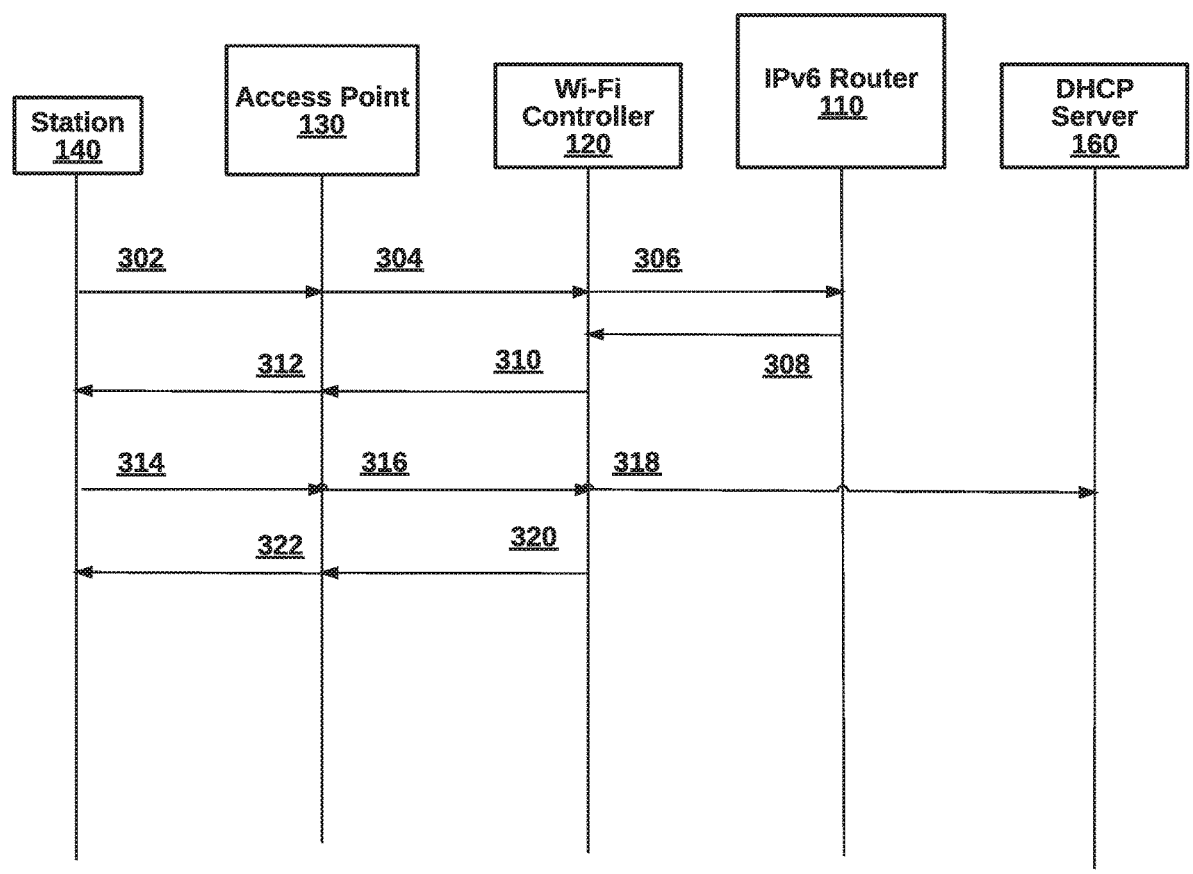
FIG. 3 is a sequence diagram illustrating interactions between components of FIG. 1, according to some embodiments.

Systems to Profile IoT Devices (FIG. 1-3)

FIG. 1 is a high-level block diagram illustrating a system 100 to profile IoT devices, according to one embodiment. The system 100 comprises an IPv6 router 110, a Wi-Fi controller 120, an access point 130, a station 140, and a DCHP (Dynamic Host Configuration Protocol) server 150.

In one embodiment, the Wi-Fi controller 120 profiles the station 140 in an IPv6 environment by compelling as DHCP solicitation request which contains identity information for the station 140, an operating system of the station 140, and other configurations. In some cases, identity information may not be available to the Wi-Fi controller 120, such as when the M and/or O flags are enabled in a router advertisement sent to the station. In response, the Wi-Fi controller 120 withholds the router advertisement rather and rather than sending the original one, sends a modified router advertisement without the M and/or O flag enabled. In response, the station 140 sends a solicitation request to the DHCP server, including identity information which can be snooped by the Wi-Fi controller 120.

In other operations, some embodiments of the Wi-Fi controller 120 manage multiple access points and stations on the network 199. For example, station hand-offs between access points can be facilitated and even forced by the Wi-Fi controller 120. Other tasks of the Wi-Fi controller 120 can include managing other aspects of access points and stations and their relationship, for example, managing BSSID assignments and hand-offs, implementing system-wide Wi-Fi policies, load balancing, managing a number of station connections at a particular access point, and the like. Additional embodiments of the Wi-Fi controller 120 are set forth in FIG. 2.

The access point 130 exchanges packets on behalf of the station 140 and other connected stations within radio range. Connection packets are forwarded upstream to the Wi-Fi controller 120 for routing to the IPv6 router 116, in an embodiment. Downstream packets are taken off the wire from an Ethernet port or other mechanism and sent over a Wi-Fi radio downstream to the station 140. In some embodiments, the access point 130 performs the router advertisement substitution when profile information of a station is unavailable.

The station 140 can be an IoT device or a conventional wireless station, mobile or stationary. Mobile stations can move from one access point to another in the system. Once profiled by the system 100, the station 140 is controlled by the access point 130 with respect to network policies.

The DHCP server 150 can automatically provide an IP host with its IP address and other related configuration information such as the subnet mask and default gateway. The DHCP server 150 sends the station 140 configuration information responsive to a solicitation request. Note that some embodiments of the system 100 do not require a DHCP server 150.

Figure 6:
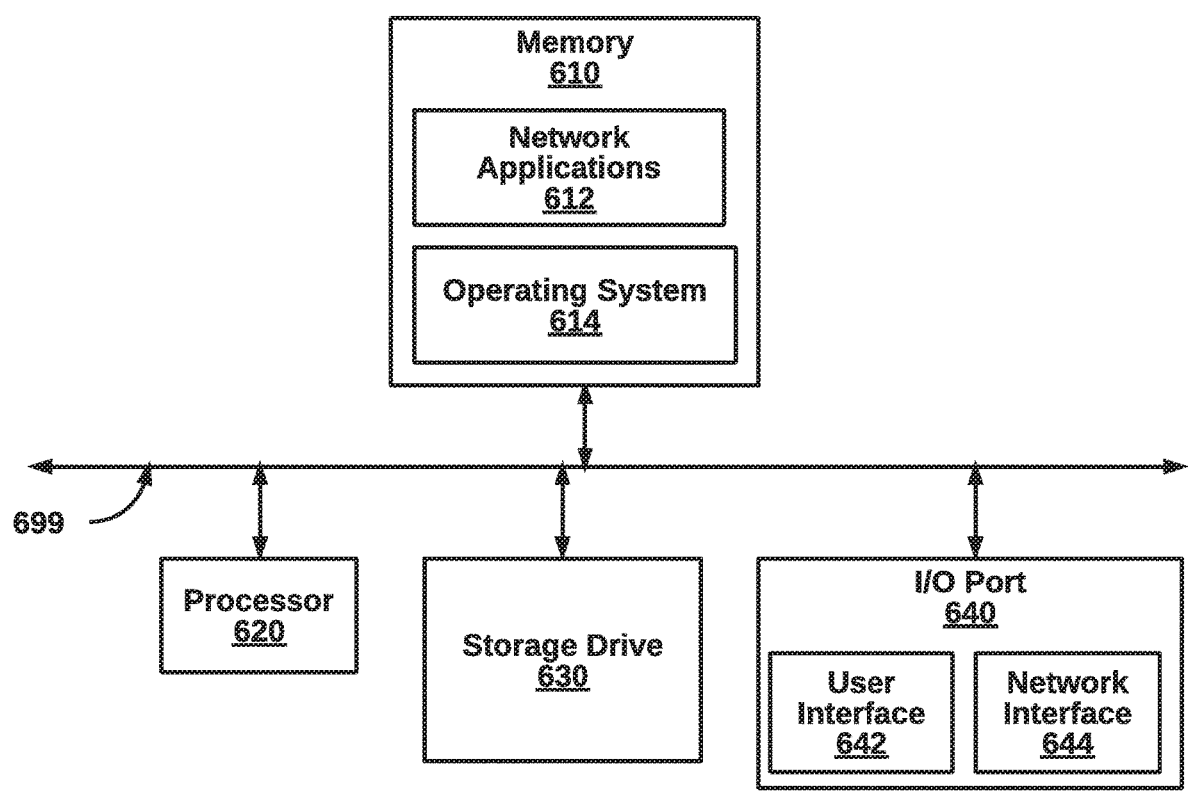
FIG. 6 is a block diagram illustrating an example computing device, according to one embodiment.

The network components of the system 100 can implemented in any of the computing devices discussed herein, for example, a personal computer, a laptop computer, a tablet computer, a smart phone, a mobile computing device, a server, a cloud-based device, a virtual device, an Internet appliance, or any of the computing devices described herein, using hardware and/or software (see e.g., FIG. 6).

Network components can be directly or indirectly coupled to a network 199, such as a LAN (local access network, a WAN (wide area network), the Internet, a cellular network, through any suitable wired (e.g., Ethernet) or wireless (e.g., Wi-Fi or 4G) medium, or combination. The station 140 is coupled by Wi-Fi connection to the access point 130 which in turn is connected to the network 199 (i.e., to network backbone components therein), preferably through a wired connection. Finally, the IPv6 router 110, the Wi-Fi controller 120 and the DHCP server 150 are also connected to the network 199, preferably through a wired connection. Many variations are possible. For example, there can be additional components such as firewalls, routers, and more switches and stations. Additionally, components can be implemented with a single physical box, or, each could represent a cluster of physical boxes acting in coordination. The system 100 can be implemented locally as a LAN or be implemented in the cloud with certain components being remotely available (e.g., through a firewall). Wi-Fi components can communicate using IEEE 802.11 protocols, including IEEE 802.11n and IEEE 802.11ac.

FIG. 2 is a more detailed block diagram illustrating a Wi-Fi controller 120 of the system of FIG. 1, respectively, according to one embodiment. The Wi-Fi controller 120 comprises a station manager 210 to generate beacons, store BSSID assignments, and other station management data. A DHCP snooping module 220 generates modified router advertisement packets as needed. The packet processing module 230 can include radios, antenna, queues, processors, and protocol software as needed to process network traffic. The components can be implemented in hardware, software, or a combination of both.

FIG. 3 is a more detailed block diagram illustrating a representative Wi-Fi controller 120 that comprises a global steering module 310, an access point manager 320, and an Ethernet controller 330. The components can be implemented in hardware, software, or a combination of both.

The global steering module 310 can distribute rules that the local steering management module 210 of the access point 110 and other access points, for uniformity and other global level concerns. In one embodiment, real-time conditions monitored by the Wi-Fi controller 120 at a different part of the network can affect the local steering module 120.

The access point manager 320 communicates with the access point 110 and other access points for Wi-Fi functionality such as beaconing, assigning BSSIDs, and handing-off stations between access points. The Ethernet controller 330 provides I/O ports for the network 199, and other directly connected devices.

Figure 4:
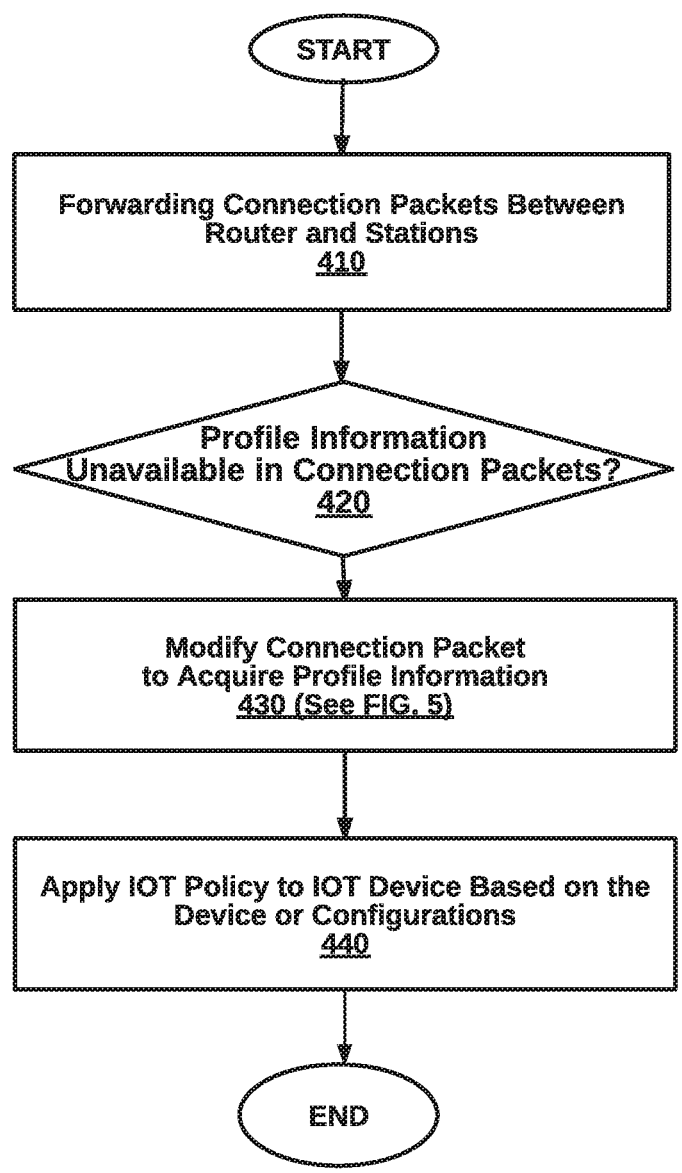
FIG. 4 is a high-level flow diagram illustrating a method for profiling IoT devices, according to one embodiment.

II. Methods Steering Wireless Stations Based on Data Exchange Capacity (FIG. 4-5)

FIG. 3 is a sequence diagram illustrating interactions between components of FIG. 1, according to some embodiments. Many variations are possible.

The station 140 sends a router solicitation upstream to the IPv6 router 110 (interactions 302, 304, 306). In response, the IPv6 router 110 sends a router advertisement (with M and/or O flags enabled) which is temporarily intercepted by the Wi-Fi controller 120 before being forwarded downstream to the station 140 (interactions 308, 320, 322). While the router advertisement is intercepted, the Wi-Fi controller 120 sends a modified router advertisement (without M and/or O flags enabled), to the station 140 (interactions 310, 312) triggering a router solicitation sent to the DHCP server 160 (interactions 314, 316, 160). The DHCP server 160 may or may not respond.

Figure 5:
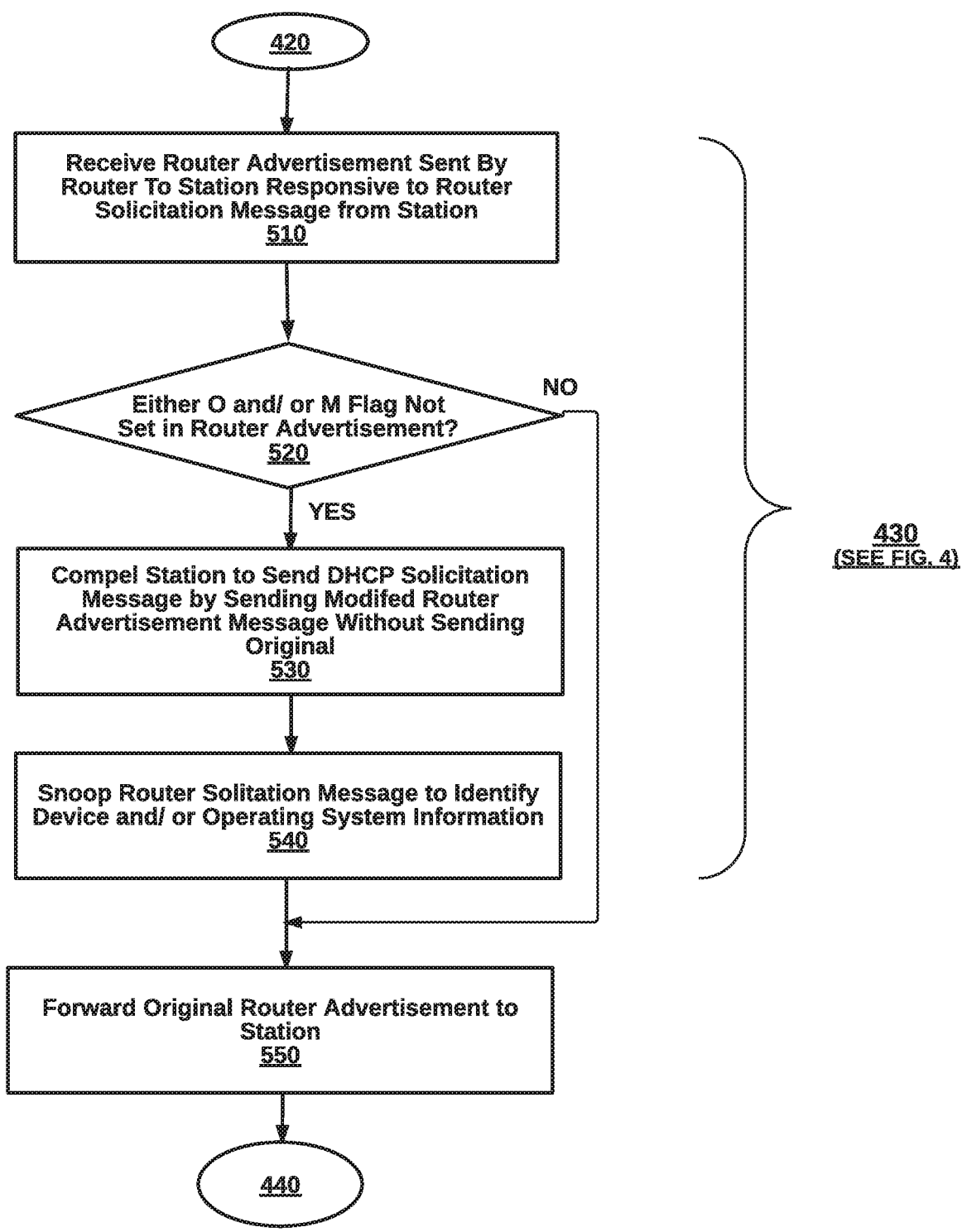
FIG. 5 is more detailed flow diagram illustrating the step of modifying connection packets to acquire profile information the method of FIG. 6, according to one embodiment.

FIG. 5 is more detailed flow diagram illustrating the step 430 of modifying connection packets to acquire profile information the method of FIG. 6, according to one embodiment.

At step 510, a router advertisement sent by a router to a station is received by an Wi-Fi controller or access point, responsive to a router solicitation method from the station. At step 520, responsive to the M and/or O flags not being set in the router advertisement, the station is compelled to send a DHCP solicitation message to a DHCP server by generating a sending a modified router advertisement message with the M and/or O flags being set (e.g., must M flag enabled). Once the DHCP solicitation message is snooped, a device and operating system on the device can be identified from the DHCP server message. At step 550, the original IPv6 router advertisement message can be sent to the station.

III. Generic Computing Device (FIG. 6)

FIG. 6 is a block diagram illustrating an exemplary computing device 600 for use in the system 60 of FIG. 1, according to one embodiment. The computing device 600 is an exemplary device that is implementable for each of the components of the system 100. The computing device 600 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 600, of the present embodiment, includes a memory 610, a processor 620, a storage drive 630, and an I/O port 640. Each of the components is coupled for electronic communication via a bus 699. Communication can be digital and/or analog, and use any suitable protocol.

The memory 610 further comprises network applications 612 and an operating system 614. The network applications 612 can include a web browser, a mobile application, an application that uses networking, a remote application executing locally, a network protocol application, a network management application, a network routing application, or the like.

The operating system 614 can be one of the Microsoft Windows® family of operating systems (e.g., Windows 95, 98, Me, Windows NT, Windows 2000, Windows XP, Windows XP x64 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 620 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the storage drive 630

The storage drive 630 can be any non-volatile type of storage such as a magnetic disc, EEPROM (electronically erasable programmable read-only memory), Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C #, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A system to profile IoT (Internet of Things) devices on a data communication network, for fingerprinting IPv6 stations for appropriate network policy enforcement, the system comprising
   a processor of the system; and
   a memory of the system coupled in communication with the processor, comprising a packet processing module and a DHCP snooping module,
      the packet processing module to receive a router advertisement sent by the router to a station in response to a router solicitation message received by the router from the station,
      the DHCP snooping module to detect that the either an O (other) flag or an M (managed) flag of the router advertisement are not set, and responsive to the router advertisement detection, generate a modified router advertisement with both the O and M flags set,
      wherein the packet processing module sends the modified router advertisement without forwarding the router advertisement, and
      wherein responsive to sending the modified router advertisement instead of the router advertisement to the station, the DHCP snooping module snoops a DHCPv6 solicit packet, to a DHCPv6 server from the station, to determine an identity of least one of device and operating system, and stores the identify determination.

2. The system of claim 1, further comprising:
   the station forwarding to the router, the router solicitation message sent by the station connecting to the network, wherein the router is an IPv6 router.

3. The system of claim 1, wherein the DHCP snooping module:
   detects a router solicitation message send from the station to the DHCPv6 server responsive to receiving the modified router advertisement.

4. The system of claim 1, wherein determining the high throughput capability comprises:
   subsequent to the DHCPv6 snoop, forwarding, from the router to the station, the router advertisement being withheld at the access point.

5. The system of claim 1, wherein:
   subsequent to the DHCPv6 solicit packet snoop, the router advertisement as originally received from the router, is forwarded to the station.

6. The system of claim 1, wherein the system:
   matches a network policy to at least one of the station and the operating system; and
   applies the network policy to interactions with the station.

7. The system of claim 1, wherein the station comprises an IoT station and the network policy controls either the IoT device or an IoT station type of the IoT device.

8. The system of claim 1, wherein the station comprises a BYOD (bring your own device) station that is not controlled by an entity that controls the Wi-Fi controller.

\* \* \* \* \*